(12) United States Patent  (10) Patent No.: US 12,365,254 B2
Miyata et al.  (45) Date of Patent: Jul. 22, 2025

(54) ELECTRIC VEHICLE AND ELECTRIC VEHICLE SYSTEM (71) Applicant: Hitachi Industrial Products, Ltd., Tokyo (JP)

(72) Inventors: Hiroaki Miyata, Tokyo (JP); Naoshi Sugawara, Tokyo (JP); Junichi Yanagita, Tokyo (JP); Kazuhiro Imaie, Tokyo (JP)

(73) Assignee: Hitachi Industrial Products, Ltd., Tokyo (JP)

( * ) Notice: Subject to any disclaimer, the term of this patent is extended or adjusted under 35 U.S.C. 154(b) by 0 days.

(21) Appl. No.: 18/281,415

(22) PCT Filed: Mar. 29, 2021

(86) PCT No.: PCT/JP2021/013172
§ 371 (c)(1),
(2) Date: Sep. 11, 2023

(87) PCT Pub. No.: WO2022/208569
PCT Pub. Date: Oct. 6, 2022

(65) Prior Publication Data
US 2024/0149705 A1 May 9, 2024

(51) Int. Cl.
B60L 50/53 (2019.01)
(52) U.S. Cl.
CPC .................. B60L 50/53 (2019.02)
(58) Field of Classification Search
CPC .................................... B60L 50/53
USPC ........................................ 307/9.1
See application file for complete search history.

(56) References Cited

U.S. PATENT DOCUMENTS 9,403,526 B2 * 8/2016 Saito ............... B60L 15/2045
2014/0081488 A1 3/2014 Erhard et al.
2015/0090554 A1 4/2015 Mazumdar

FOREIGN PATENT DOCUMENTS

| EP | 2 755 852 B1 | 3/2018 | |
| EP | 3 556 594 A1 | 10/2019 | |
| EP | 2 691 255 B1 | 3/2020 | |
| GB | 2629580 A * | 11/2024 | ............ B60L 3/0046 |
| JP | 2008253084 A * | 10/2008 | |
| JP | 2012-40954 A | 3/2012 | |
| JP | 2013-17315 A | 1/2013 | |

(Continued)

OTHER PUBLICATIONS

English translation, JP 2008-253084, downloaded from https://worldwide.espacenet.com Feb. 24, 2025. (Year: 2025).*

(Continued)

Primary Examiner — Hal Kaplan
(74) Attorney, Agent, or Firm — Crowell & Moring LLP (57) ABSTRACT The present invention prevents a failure from occurring in an electric vehicle. This electric vehicle is driven by power obtained from a power line via a collector, an energy source mounted on the electric vehicle, or using both thereof, and causes power generated, for example, during braking to be regenerated to the power line via the collector or to be consumed in a load mounted on the electric vehicle. The electric vehicle is characterized by having a function of electrically separating the collector from the power line when the voltage of the power line or a circuit voltage within the electric vehicle deviates from a predetermined range.

11 Claims, 7 Drawing Sheets (56) References Cited

FOREIGN PATENT DOCUMENTS

| | | | |
|---|---|---|---|
| JP | 2014-64398 A | | 4/2014 |
| JP | 2014064398 A | * | 4/2014 |
| JP | 2018-38217 A | | 3/2018 |

OTHER PUBLICATIONS

English translation, JP 2014-064398, downloaded from https://worldwide.espacenet.com Feb. 24, 2025. (Year: 2025).*
International Search Report (PCT/ISA/210) issued in PCT Application No. PCT/JP2021/013172 dated Apr. 20, 2021 with English translation (5 pages).
Japanese-language Written Opinion (PCT/ISA/237) issued in PCT Application No. PCT/JP2021/013172 dated Apr. 20, 2021 (7 pages).
Extended European Search Report issued in European Application No. 21934746.5 dated Dec. 2, 2024 (9 pages).

* cited by examiner

ELECTRIC VEHICLE AND ELECTRIC VEHICLE SYSTEM

TECHNICAL FIELD

The present invention relates to an electric vehicle and an electric vehicle system.

BACKGROUND ART

Today, transportation means that receive power supply from an overhead power line to drive a power vehicle have been widely used. Typical such transportation means have been electric railcars, tramcars and trolleybuses, but recently such transportation means have also been applied to dump trucks as disclosed in Patent Literature 1.

CITATION LIST

Patent Literature

PTL 1: Japanese Patent Application Laid-Open No. 2013-17315

SUMMARY OF INVENTION

Technical Problem

Electric vehicles driven by power from an overhead power line are operated separately for forward and return lines, except for a loop line. In this case, when the vehicles are operated on a flat road, an imbalance in power consumption between the upbound electric vehicle and the downbound electric vehicle rarely occurs. However, when the vehicles are mainly operated in an area where a slope continues in one direction, for example, a mountainous area or an opencast mine slope, there is following problems. Even if the same power is supplied to the uphill side, where power is consumed by the motor to drive the motor of the electric vehicle, and the downhill side, where the vehicle descends by its own weight without consuming power or the vehicle is operated while generating power with electric power regenerative brake, etc., there will be a shortage of power on the uphill side and an excess of power on the downhill side.

The present invention provides means to prevent a failure from occurring in an electric vehicle due to the above problem.

Solution to Problem

The electric vehicle is driven by power obtained from a power line via collector, an energy source mounted on the electric vehicle, or using both thereof, and causes power generated, for example, during braking to be regenerated to the power line via the collector or to be consumed in a load mounted on the electric vehicle. The electric vehicle has a function of electrically separating the collector from the power line when the voltage of the power line or a circuit voltage within the electric vehicle deviates from a predetermined range.

Advantageous Effects of Invention

According to the present invention, it is possible to prevent a failure from occurring in an electric vehicle.

Further advantageous effects of the present invention will become apparent from the specification given below.

BRIEF DESCRIPTION OF DRAWINGS

FIG. 7 is a schematic operation explanatory diagram

DESCRIPTION OF EMBODIMENTS

Embodiments of the present invention will be described referring to drawings.

Embodiment 1

Figure 3:
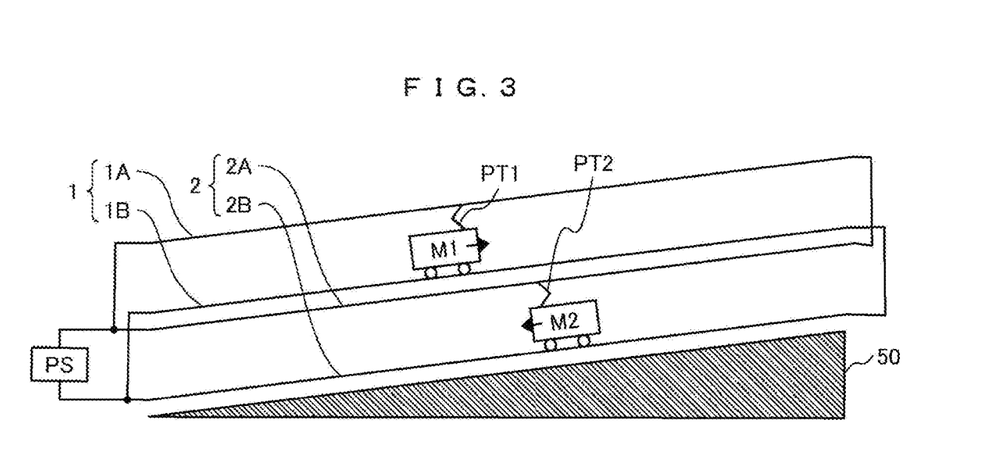
FIG. 3 is an explanatory diagram of the electric vehicle system according to the first embodiment.

FIG. 3 is an explanatory diagram of an electric vehicle system that operates upbound and downbound electric vehicles in a slope area. The reference sign 50 denotes a slope. The reference sign PS denotes a power source and includes a case that power is supplied from an external system. The high-voltage side power line connected to the power source PS branches into an uphill side high-voltage side power line 1A and a downhill side high-voltage side power line 2A and they are again connected to each other at a far end. Similarly, the low-voltage side power line connected to the power source PS branches into an uphill side low-voltage side power line 1B and a downhill side low-voltage side power line 2B and they are again connected to each other at a far end.

The reference sign M1 denotes an electric vehicle on the uphill line. The electric power from the uphill side high-voltage side power line 1A is introduced from a high-voltage side input section of the electric vehicle via a pantograph PT1 to drive a motor directly or indirectly. The electric vehicle M1 on the uphill line has a low-voltage side input section corresponding to the high-voltage side input section and is connected to the uphill side low-voltage side power line 1B. FIG. 3 shows an example that it is connected to metal rails constituting the uphill side low-voltage side power line 1B through metal wheels.

The reference sign M2 denotes an electric vehicle on the downhill line. The electric power from the downhill side high-voltage side power line 2A is introduced from a high-voltage side input section of the electric vehicle via a pantograph PT2 to drive a motor directly or indirectly. The electric vehicle M2 on the downhill line has a low-voltage side input section corresponding to the high-voltage side input section and is connected to the downhill side low-voltage side power line 2B. FIG. 3 shows an example that it is connected to metal rails constituting the downhill side low-voltage side power line 2B through metal wheels.

The above explanation includes both the case that the power source PS supplies DC power and the case that it supplies AC power.

The pantograph PT1 and pantograph PT2 are not limited to pantographs but may be anything that can perform a function to supply power, such as a trolley pole.

Here, since the electric vehicle M1 on the uphill line is on the uphill line, it drives the motor to ascend by consuming the power supplied from the power line. On the other hand, since the electric vehicle M2 on the downhill line is on the downhill line, desirably it includes a power generating type brake such as a holding brake or a power regeneration brake in order to decrease the descent speed. In that case, the motor of the electric vehicle M2 on the downhill line functions as a power generator and the generated power flows back to the power line. Therefore, the electric vehicle M1 on the uphill line consumes power and the electric vehicle M2 on the downhill line supplies power. Therefore, the way of power consumption is quite opposite between the electric vehicle on the uphill line and the electric vehicle on the downhill line.

The power condition in this case is explained below referring to FIG. 4 as a schematic equivalent circuit diagram for FIG. 3.

In the explanation below, including other drawings, the same reference signs in FIG. 3 mean the same functions and repeated description thereof is omitted.

Figure 4:
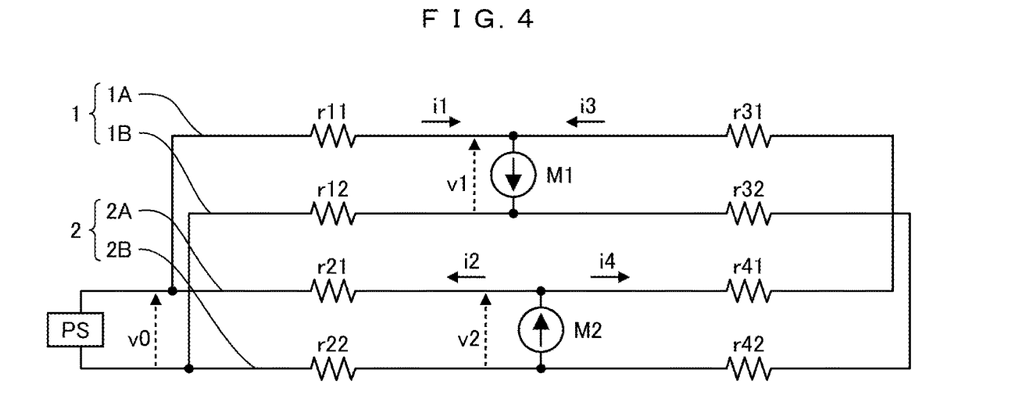
FIG. 4 is a schematic equivalent circuit diagram according to the first embodiment.

In FIG. 4, "r" with a suffix denotes a power line resistance of each power line.

The reference sign v0 denotes a voltage value in the vicinity of the power source PS, the reference sign v1 denotes the uphill line voltage value of the electric vehicle M1 on the uphill line, and the reference sign v2 denotes the downhill line voltage value of the electric vehicle M2 on the downhill line. Since the electric vehicle M1 on the uphill line is powered by the motor, the flow of power is as indicated by i1 and i3, which corresponds to the direction of flow from the uphill side high-voltage side power line 1A to the electric vehicle M1 on the uphill line. On the contrary, the electric vehicle M2 on the downhill line generates power, for example, by a regeneration brake and the power flows as indicated by i2 and i4, which corresponds to the direction of flow from the electric vehicle M2 on the downhill line to the downhill side high-voltage side power line 2A.

The power condition at this time is as follows. (1) The energy of the whole power line system is reduced due to power consumption by the electric vehicle M1 under power running on the uphill line.

(2) The decrease in the energy of the whole power line system causes the power line voltage to decrease. The power regeneration by the electric vehicle M2 on the downhill line results in an increase in the energy of the whole power line system.

(3) At this time, the power source PS not only supplies power to the power line but also keeps the power line voltage constant by adjusting the power to be passed to adjust the energy of the whole power line system.

(4) However, in addition to the above increase and decrease in the energy of the whole system, the current flowing toward the electric vehicle M1 on the uphill line and the voltage drop on the power line due to the current cause the power line voltage v1 at the position of the electric vehicle M1 on the uphill line to become lower than power source voltage v0.

In terms of the equivalent circuit, this means the following equation:

$$v1 = v0 - i1 \times (r11 + r12) < v0$$

(5) Similarly, the current flowing from the electric vehicle M2 on the downhill line and the voltage drop on the power line due to the current cause the power line voltage v2 at the position of the electric vehicle M2 on the downhill line to become higher than the power source voltage.

In terms of the equivalent circuit, this means the following equation:

$$v2 = v0 + i2 \times (r21 + r22) > v0$$

Therefore, the following problems occur.

(A) When the power line voltage v1 decreases in the electric vehicle M1 on the uphill line, the energy that the electric vehicle M1 on the uphill line can use to keep and accelerate the speed is reduced and thus there arises a problem that the acceleration decreases and as a result the speed drops.

(B) When the power line voltage increases in the electric vehicle M2 on the downhill line due to the power supply from the electric vehicle M2 on the downhill line to the power line, it may exceed the withstand voltage of the electric vehicle M2 on the downhill line, or in order to prevent this problem, a means to decrease the voltage supplied from the power source PS to the power line in advance may be adopted but this may cause another problem that the driving force of the electric vehicle M1 on the uphill line decreases.

Figure 5:
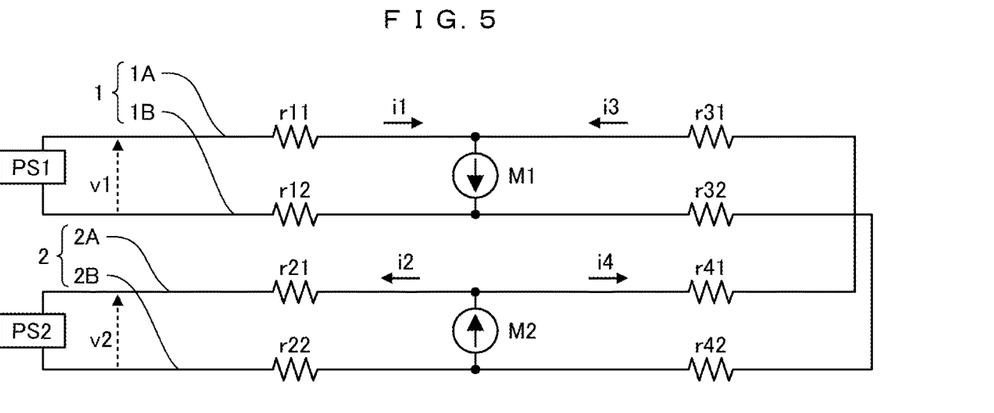
FIG. 5 is a schematic equivalent circuit diagram of a reference example.

(C) In the reference example shown in FIG. 5, unlike the example of FIG. 4 in which one power source PS is used, the power source PS includes a first power source PS1 for the uphill line and a second power source PS2 for the downhill line. The voltage of the first power source PS1 is high and the voltage of the second power source PS2 is low. However, in this case, the cost of the power source PS is simply doubled. In addition, since the voltages are different from each other, there may arise a new problem that the electric current must be controlled between the uphill side high-voltage side power line 1A and the downhill side high-voltage side power line 2A, which they are connected at the end.

Figure 1:
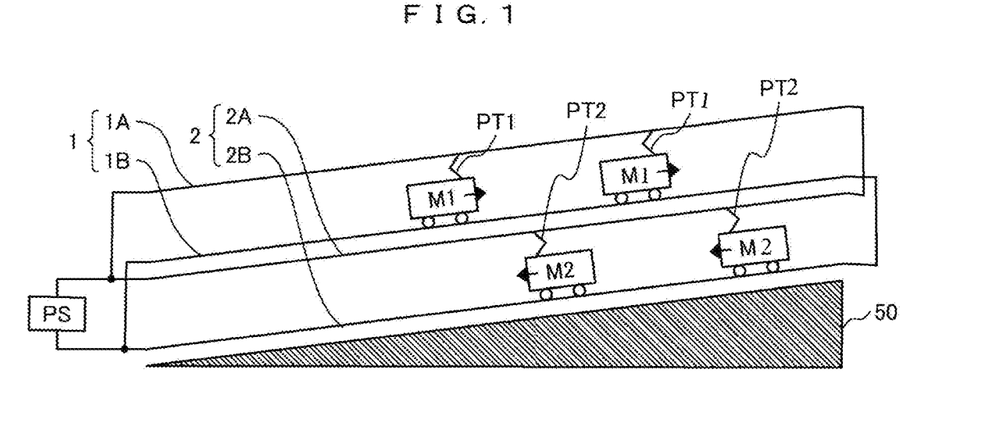
FIG. 1 is an explanatory diagram of an electric vehicle system according to a first embodiment.

FIG. 1 is a diagram showing a case that a plurality of electric vehicles travel unlike the case in FIG. 3. Since a plurality of electric vehicles are on each of the uphill and downhill lines, the increase in the power line voltage on the downhill line and the decrease in the power line voltage on the uphill line will be augmented.

Figure 2:
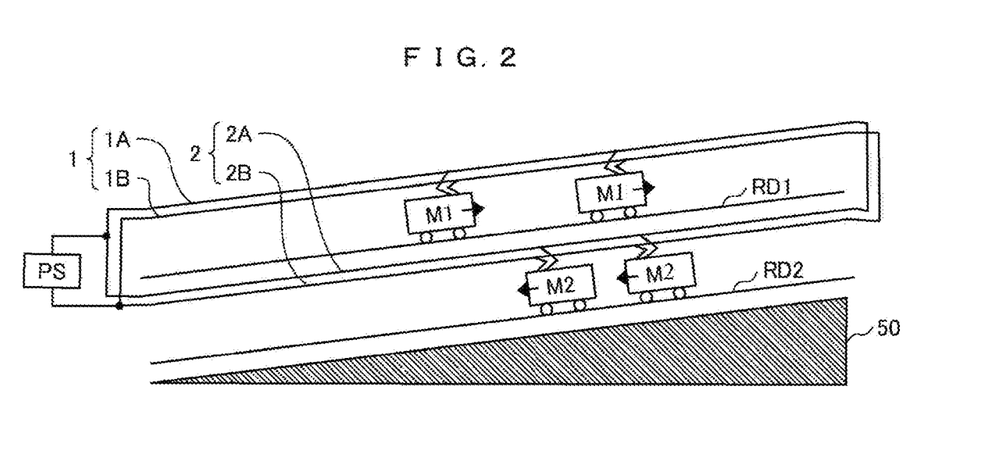
FIG. 2 is an explanatory diagram of the electric vehicle system according to the first embodiment.

FIG. 2 is an explanatory diagram of another example of the electric vehicle system. The difference from FIG. 1 is that the uphill side low-voltage side power line 1B and downhill side low-voltage side power line 2B are constituted not by rails but by overhead power lines. The reference sign RD1 and RD2 denote road surfaces. In FIG. 2, the power from the uphill side high-voltage side power line 1A is supplied to the electric vehicle M1 on the uphill line via a first conductive pole and then flows to the uphill side low-voltage side power line 1B via a second conductive pole. Similarly, the power from the downhill side high-voltage side power line 2A is supplied to the electric vehicle M2 on the downhill line via another first conductive pole and then flows to the downhill side low-voltage side power line 2B via another second conductive pole.

The example in FIG. 2 is suitable for applications such as electric trucks. In addition, when the slope is steep and non-metal wheels such as rubber tires for driving are provided, the configuration in FIG. 2 may be used instead of the one in FIG. 1.

In addition, if the power source PS supplies AC power, the configuration in FIG. 2 is suitable because the high-voltage side configuration can be the same as the low-voltage side configuration, particularly when AC power is supplied to the power line.

If the power line voltage rises on the downhill line and the voltage rise is excessive, the problem is that it may exceed the withstand voltage of the electric system equipment of the electric vehicle. The use in excess of the withstand voltage may result in a decline in the service life or at worst a breakdown. Another problem may be that a failure in power regeneration to the power line lowers the effect of the regeneration brake and as a result the speed of the electric vehicle cannot be decreased to a desired level or the burden on the mechanical brake is increased.

Therefore, the electric vehicle in this embodiment is characterized in that when the overhead wire voltage supplied to the electric vehicle or the circuit voltage in the electric vehicle deviates from a predetermined range, on the uphill side or during power running, the electric vehicle is driven by the energy in the electric vehicle and on the downhill side or during speed holding, it is driven so as to accumulate the energy in the electric vehicle or consume the energy in the electric vehicle.

Figure 6A:
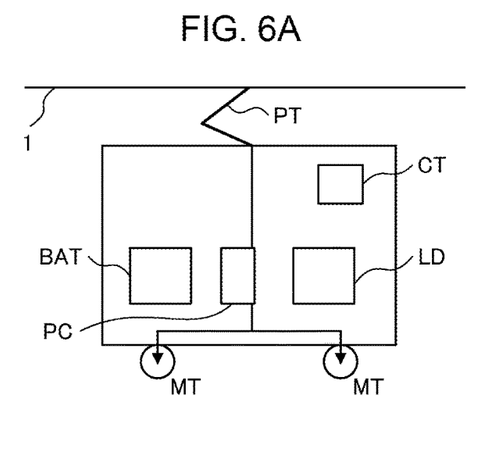
FIGS. 6A and 6B are schematic operation explanatory diagrams of an electric vehicle during uphill travel according to the first embodiment.

FIG. 6(a) shows a normal traveling condition as an example of the electric vehicle in this embodiment. The power from an overhead wire 1 is brought through a pantograph PT into a power controller PC and the output from the power controller PC drives a motor MT. The figure shows an example on the uphill line and in an example on the downhill line, the motor MT functions as a regenerator and the power is converted by the power controller PC and the regenerated power is supplied from the pantograph PT to the overhead wire 1.

Figure 6B:
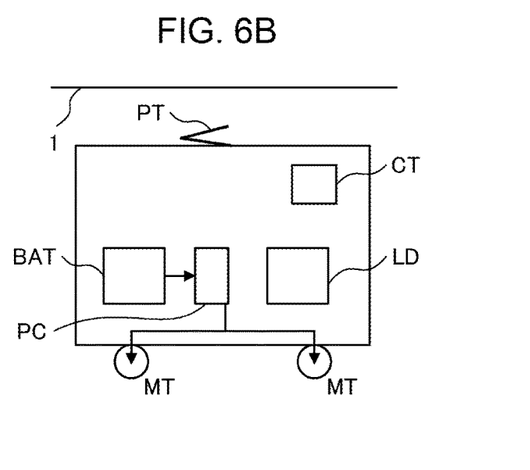

FIG. 6(b) shows a condition that the overhead wire voltage supplied to the electric vehicle or the circuit voltage in the electric vehicle deviates from a predetermined range, the pantograph PT is separated from the overhead wire 1 to cancel the exchange of power with the overhead wire. The figure shows that a power detection sensor (not shown) measures the overhead wire voltage supplied to the electric vehicle or the circuit voltage in the electric vehicle, and if the voltage deviates from the predetermined range, the controller CT sends a command to separate the pantograph PT from the overhead wire 1 and the pantograph PT is separated from the overhead wire 1.

At this time, in the case of the uphill line, as shown in FIG. 6(b), power is supplied from a battery (power supply device) BAT to the power controller PC and the power drives the motor MT. The battery BAT is not limited to static means but includes dynamic means, for example, an engine or an auxiliary generator which supplies power. The motor MT is not limited to a motor installed near the wheels or tires or an integrally installed motor, but definitely it includes a motor mounted on the body of the electric vehicle to drive the wheels or tires via a drive-train.

Disconnection on the uphill line is needed mainly when the overhead wire voltage supplied to the electric vehicle or the circuit voltage in the electric vehicle is lower than the predetermined range. In this case, in order to ensure stability of the system and prevent the operation performance of the electric vehicle from declining due to power shortage, the vehicle is electrically separated from the overhead wire. Consequently, the overhead wire voltage can be recovered and the stability of the system can be recovered.

On the other hand, disconnection on the downhill line is needed when the regenerated power is excessive, the regenerated power supplied to the overhead wire is excessive and the overhead wire voltage or the circuit voltage in the electric vehicle is higher than the predetermined range. In this case, in order to ensure the stability of the system and prevent regeneration failure due to an excessive voltage or breakdown of an electric component, the vehicle is electrically separated from the overhead wire. Consequently, the overhead wire voltage can be recovered and the stability of the system can be recovered.

Figure 7A:
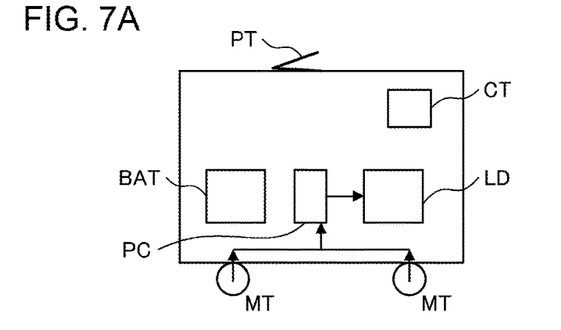
FIGS. 7A to 7C are schematic operation explanatory diagrams of the electric vehicle during downhill travel according to the first embodiment.

In the case of the downhill line, as shown in FIG. 7(a), the motor MT functions as a power generator and the regeneration brake is activated when the power is consumed by a load LD through the power controller PC. Consequently, when the overhead wire voltage or the circuit voltage in the electric vehicle deviates from the predetermined range, even if the pantograph PT is separated from the overhead wire 1 and exchange of power with the overhead wire is cancelled, the regeneration brake can function effectively.

Figure 7B:
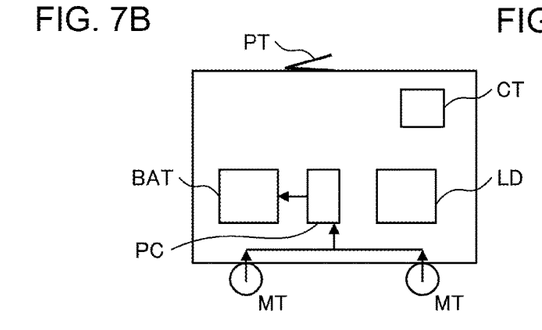

FIG. 7(b) is a diagram showing that instead of the load LD in FIG. 7(a), the power controller PC converts the power to charge the battery BAT so that the regeneration brake functions. In this case, the charged power can be used effectively at the time of ascent and the power can be used effectively.

Figure 7C:
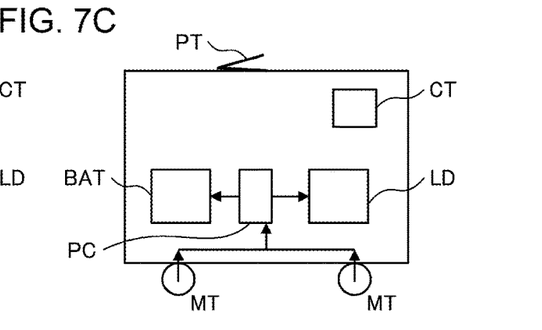

FIG. 7(c) is a diagram showing an example that the power controller PC distributes power to the load LD and battery BAT appropriately depending on the circumstances. If the regenerated power is large and exceeds the charge capacity of the battery BAT for a short time, the load LD consumes the surplus power, thereby preventing deterioration of the battery. Needless to say, when the battery BT is fully charged or nearly fully charged, the regenerated power can be distributed appropriately in the same way.

Embodiment 2

Figure 8:
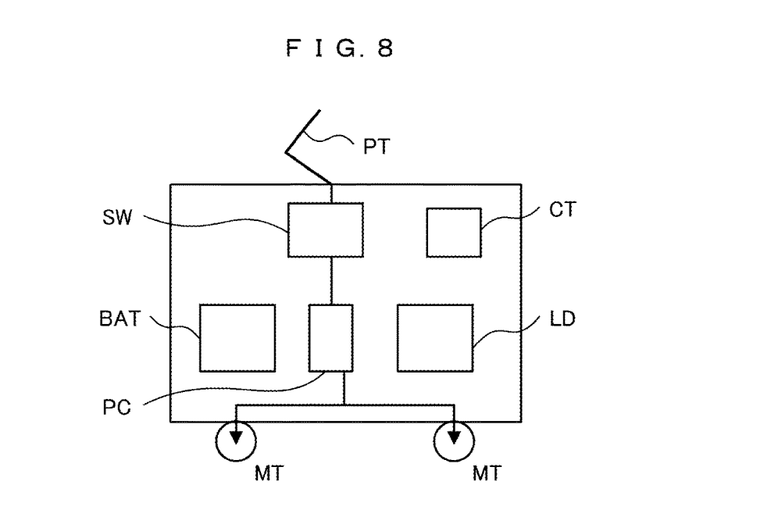
FIG. 8 is a schematic operation explanatory diagram of the electric vehicle according to a second embodiment.

FIG. 8 is a diagram that corresponds to FIG. 6(a). The difference is that a switching device SW is provided between the pantograph PT and power controller PC. Consequently, by turning off the power using the switching device SW, the electric vehicle can be electrically separated from the overhead wire 1 without physically separating the pantograph PT from the overhead wire 1 as shown in FIG. 6(b).

When the overhead wire and electric vehicle are electrically separated through a mechanical movement such as housing or folding of the pantograph PT, the time for such movement is required and particularly it takes time to reconnect them. On the other hand, regarding the movement through the switching device SW, the switching device SW is small as compared to the pantograph PT and the distance between contact points in the switching device SW is smaller than the distance between the pantograph PT and the overhead wire 1 for separation, so they can be reconnected almost instantly. This makes it possible to operate the electric vehicle in terms of electric power more efficiently and smoothly. Especially, reconnection causes the overhead wire voltage to change after reconnection and if the voltage deviates from a predetermined range as a result of reconnection, it is desirable to disconnect them again quickly. Since the use of the switching device SW makes it possible to turn on and off quickly in this way, it is effective for stability of the whole electric vehicle system.

The switching device SW may include current-limiting resistors or the like to provide a plurality of lines with different current values so that these lines may be used sequentially. Consequently, electric connection to the overhead wire 1 can be made in a stepwise manner and reconnection can be made while checking the electric stability of the lines and the influence on the lines at the time of reconnection. As for the plurality of lines, after stable connection is obtained, it may be desirable to use only a line without a current-limiting resistor for connection. The reason is that power consumption by current-limiting resistors can be reduced by doing so.

The switching device SW is not limited to a mechanical switching device but may include a semiconductor type switching device.

Figure 9:
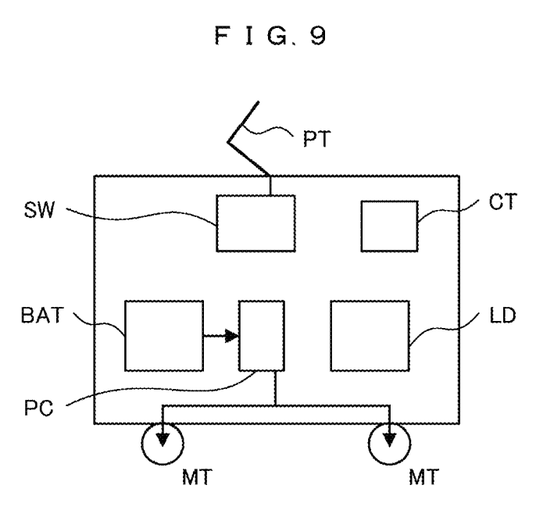
FIG. 9 is a schematic operation explanatory diagram of the electric vehicle during uphill travel according to the second embodiment.
Figure 10:
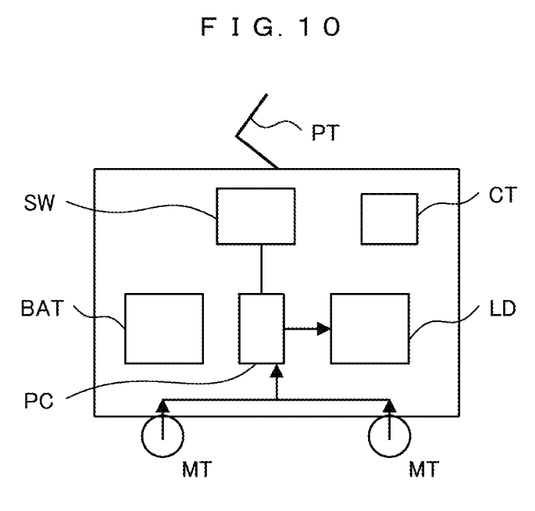
FIG. 10 is a schematic operation explanatory diagram of the electric vehicle during downhill travel according to the second embodiment.

FIG. 9 is a diagram that corresponds to FIG. 6(b) and shows that the switching device SW is turned off instead of lowering the pantograph PT, and the power from the battery BAT drives the motor MT. FIG. 10 is a diagram that corresponds to FIG. 7(a) and shows that the motor MT functions as a power generator during descent and the power is supplied to the load LD by the power controller PC and consumed by the load LD so that this functions as a regeneration brake. Although not shown, as in FIG. 7(b) and FIG. 7(c), the power from the motor MT may be used to charge the battery BAT or the power controller PC may distribute the power to the battery BAT and the load LD.

Embodiment 3

Figure 11:
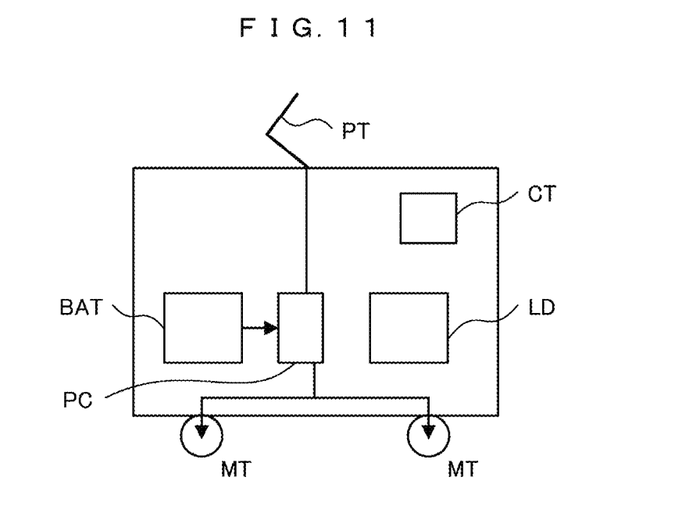
FIG. 11 is a schematic operation explanatory diagram of the electric vehicle during uphill travel according to a third embodiment.
Figure 12:
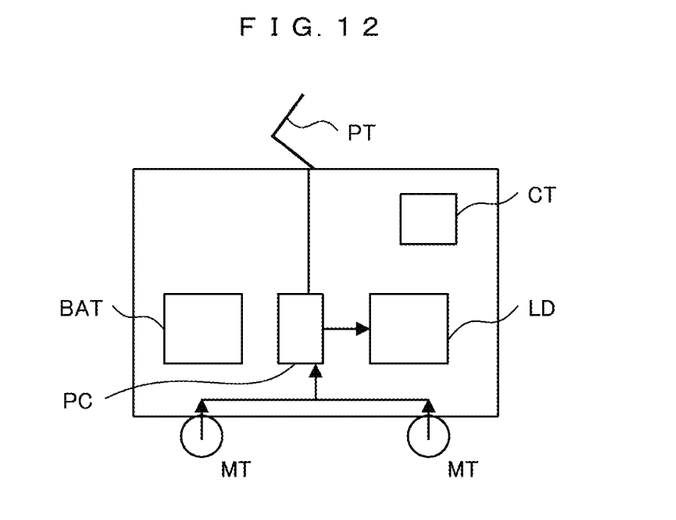
FIG. 12 is a schematic operation explanatory diagram of the electric vehicle during downhill travel according to the third embodiment.

The difference of the third embodiment from the second embodiment is that the function of the switch SW is integrated with the power controller PC. This can reduce the number of hardware items and realize more flexible control. FIG. 11 shows a condition of ascent in which if the overhead wire voltage drops, the battery BT compensates for power shortage to realize continuous and stable uphill travel and acceleration and keep the speed. FIG. 12 shows a condition of descent in which the regenerated power is partially consumed by the load LD or partially used to charge the battery BAT and the remaining power is turned back to the overhead wire as regenerated power to prevent the overhead wire voltage from rising excessively due to the regenerated power and prevent it from deviating from a predetermined voltage range.

Embodiment 4

When only one electric vehicle is on each of the uphill and downhill lines as schematically shown in FIG. 3, deviation of the overhead wire voltage from the predetermined range can be easily prevented only by the above configurations of the first to third embodiments. However, when electric vehicles are used, a situation that as schematically shown in FIG. 1, a plurality of electric vehicles travel on the uphill and downhill lines at the same time is expected.

In the case that a plurality of vehicles travel in this way, if the electric connection to the overhead wire is turned on or off for all the vehicles at the same time in accordance with the same rule, even though the voltage can be restored to the normal range by turning off the power to only one of, for example, ten vehicles, the utilization of internal power or the consumption of internal power is changed in all the vehicles at the same time. This leads to inefficient operation of the whole electric vehicle system.

Therefore, when a plurality of electric vehicles travel, first some of the vehicles are electrically disconnected from the overhead wire to attempt restoration to the normal range and if the normal range cannot be attained by doing so, it is desirable to disconnect additional vehicles step by step. This disconnection can be made in the order of earliness of response from the on-vehicle voltage detection sensor of each electric vehicle.

Therefore, by varying the detection speed of the sensor mounted on each vehicle, the above order can be voluntarily determined easily.

As one example, after the value detected by the sensor is digitalized, a certain time-wait is set. This time-wait value is varied for each electric vehicle or for each group of electric vehicles. In order to flexibly cope with the operation environment, this setting may be made on the vehicle or remotely. The controller CT which controls the vehicle electric system waits for the set wait time after detection of deviation by the sensor until the own vehicle sends a command for electric disconnection from the overhead wire to the pantograph PT and switching device SW or the power controller PC, and then sends a command. If, within the wait time, the value detected by the sensor is restored to the normal range and disconnection is made, the whole system is excessively disconnected, resulting in a decline in overall efficiency. Therefore, if restoration to the normal range is confirmed before output of a disconnection command, output of a disconnection command is stopped to prevent excessive disconnection.

Embodiment 5

The difference of this embodiment from the fourth embodiment is the method to determine which electric vehicle should be first disconnected.

Figure 13:
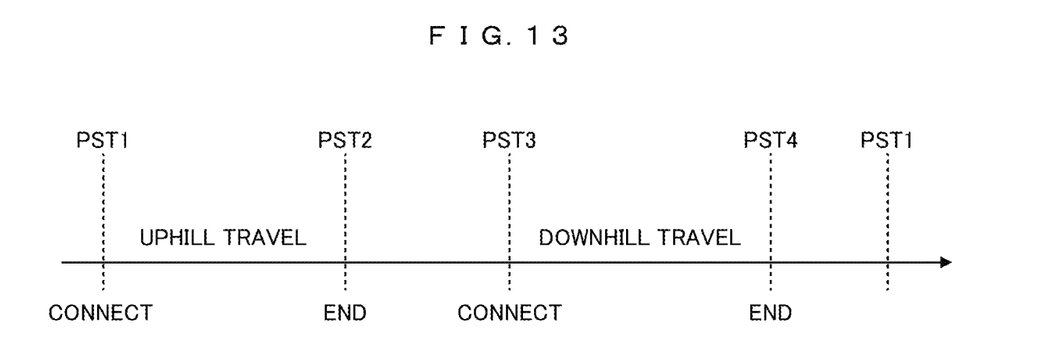
FIG. 13 is an explanatory diagram of a setting point in the electric vehicle according to a fifth embodiment.

In FIG. 13, the horizontal axis shows an image of the travel route of an electric vehicle. At the first position PST1, the electric vehicle is connected to the overhead wire and starts uphill travel.

The vehicle continues uphill travel and at the second position PST2, it ends the uphill travel.

After that, until the third position PST3, transportation or loading/unloading of persons, baggage, sand, ore or the like may be carried out while the vehicle remains connected to the overhead wire. Alternatively, during the period from PST2 to PST3, the vehicle may be disconnected from the overhead wire and travel by itself to carry out transportation or loading/unloading of persons, baggage, sand, ore or the like.

Next, at the third position PST3, the vehicle is connected to the overhead wire and starts downhill travel. The vehicle continues downhill travel and at the fourth position PST4, it ends the downhill travel.

After that, the vehicle returns to the first position PST1. Before return to PST1, transportation or loading/unloading of persons, baggage, sand, ore or the like may be carried out while the vehicle remains connected to the overhead wire. Alternatively, during the period from PST4 to PST1, the vehicle may be disconnected from the overhead wire and travel by itself to carry out transportation or loading/unloading of persons, baggage, sand, ore or the like.

As mentioned above, since PST1 and PST3 are specified as the main points of connection to the overhead wire, at the time of passing through PST1 or PST3, a central center CC which controls all the electric vehicles may specify the electric vehicle to be disconnected when it is passing through PST and send a command to it. The electric vehicle which has received the command gives information to its own controller CT that it is to be disconnected and starts constant monitoring of the voltage by the sensor. Alternatively, while the electric vehicle passes through PST, the central center CC may indicate the electric vehicle its order of priority in disconnection. Consequently, the electric vehicle can set a shorter time-wait in the fourth embodiment when the indicated order of priority is higher.

Embodiment 6

The main difference of this embodiment from the fourth embodiment and fifth embodiment is the method to set which electric vehicle should be first disconnected.

In this embodiment, the electric vehicle to be disconnected is specified in advance.

Figure 14:
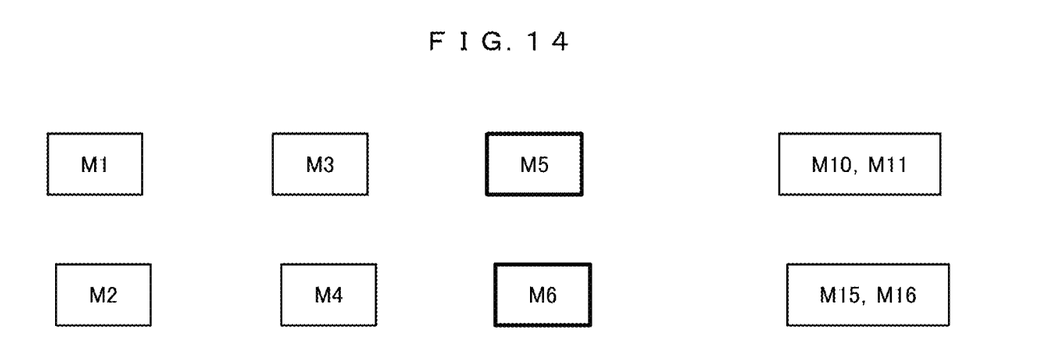
FIG. 14 is an explanatory diagram of an example of priority order determination in the electric vehicle according to a sixth embodiment.

In a large-scale system in which tens of electric vehicles always travel, when several electric vehicles are specified in advance to be disconnected, these electric vehicles are expected to be averagely dispersed. For this reason, as shown in FIG. 14, the reference signs M5 and M6 may be specified as objects to be disconnected in advance. If a larger number of electric vehicles are used, the reference signs M10 and M11, and the reference signs M15 and M16 may be specified in advance as additional electric vehicles to be disconnected.

In this case, occasional setting work is omissible and convenience in operation is improved.

Embodiment 7

The main difference of this embodiment from the fourth embodiment and fifth embodiment is the method to set which electric vehicle should be first disconnected.

Figure 15:
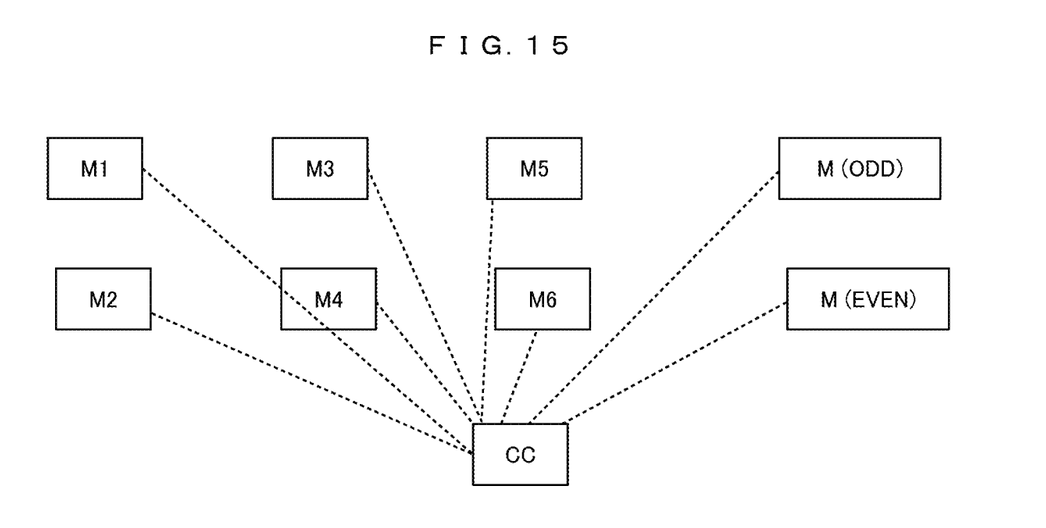
FIG. 15 is an explanatory diagram of an example of priority order determination in the electric vehicle according to a seventh embodiment.

FIG. 15 shows the concept of this embodiment. In each electric vehicle, the on-vehicle controller CT is connected to the central center CC by wireless communications. The voltage value detected by the sensor of each electric vehicle is transmitted to the central center CC as needed. The central center CC judges the voltage condition, determines the electric vehicle to be disconnected and sends a disconnection command to that electric vehicle. The electric vehicle which has received the disconnection command performs electric disconnection from the overhead wire to restore the whole electric system from deviation from the predetermined range or tendency of deviation.

When the central center CC determines the electric vehicle to be given a disconnection command, it is desirable to determine the electric vehicle in the order of unlikeliness of deterioration in the electric vehicle performance or in the order of efficiency for stability of the system, considering one or ones of the position of each electric vehicle, the speed, the slope, the travel destination terrain and the like. In this case, electric vehicle groups can be operated more efficiently.

For the purpose of collecting information such as the slope, terrain and travel information, a position identifying means like GPS may be mounted on each electric vehicle and the central center CC may store and use the information to determine the electric vehicle to which it sends a disconnection command. This makes it easy to obtain high accuracy information.

Embodiment 8

The difference of this embodiment from the seventh embodiment is the method to determine which electric vehicle should be first disconnected.

Figure 16:
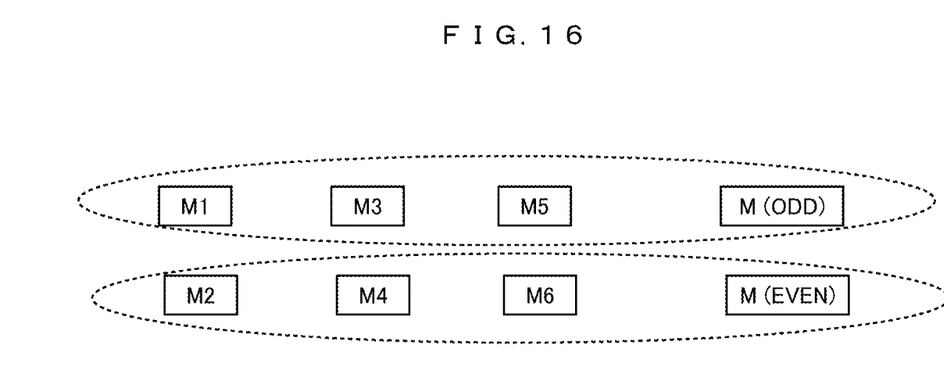
FIG. 16 is an explanatory diagram of an example of priority order determination in the electric vehicle according to an eighth embodiment.

FIG. 16 shows the concept of this embodiment. Whereas the central center CC corresponds to one electric vehicle (1:1) as shown in FIG. 15, in this embodiment, in each of an uphill side electric vehicle group M (ODD) and a downhill side electric vehicle group M (EVEN), the electric vehicles wirelessly communicate with each other within the group as shown in FIG. 16 and each group autonomously determines the electric vehicle to be disconnected. In this case, regardless of whether the central center CC is not available or the overhead wire is extended to a distant position from the central center CC, an adequate wireless communication environment can be maintained and a delay in determination of disconnection due to communication trouble can be avoided.

In other words, whereas the seventh embodiment may be called the central control type, this embodiment may be called the autonomous decentralized control type.

Furthermore, if the total length of the overhead wire is very large or the wireless communication environment is poor, one approach may be that in the same group, only electric vehicles capable of communicating with each other form a sub group and whether or not to disconnect or which electric vehicle to be disconnected is determined within the sub group. This makes it possible to cope with various electric vehicle operation environments and ensure more adequate operation.

Embodiment 9

The difference of this embodiment from the eighth embodiment is the method to determine which electric vehicle should be first disconnected.

Figure 17:
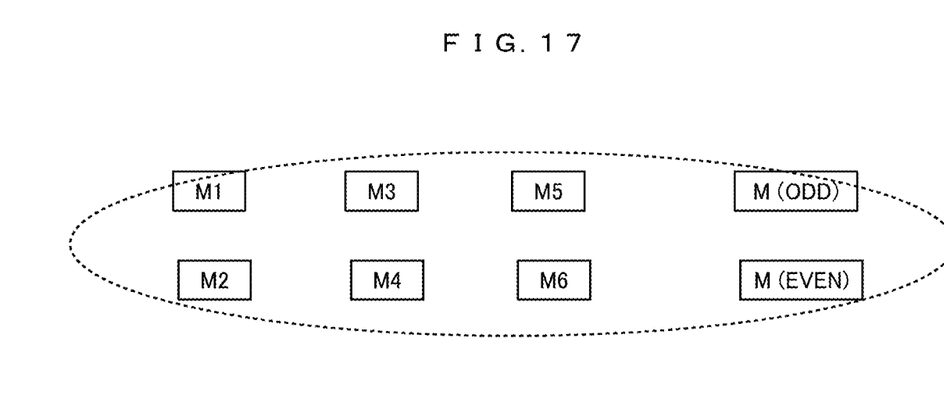
FIG. 17 is an explanatory diagram of an example of priority order determination in the electric vehicle according to a ninth embodiment.

FIG. 17 shows the concept of this embodiment. Whereas FIG. 16 shows that the electric vehicles are divided into an uphill travel group and a downhill travel group, in this embodiment, all the electric vehicles constitute one group. This eliminates the need for a special facility like the central center CC and reduction in operation cost can be expected.

Embodiment 10

The difference of this embodiment from the eighth embodiment is the method to determine which electric vehicle should be first disconnected.

Figure 18:
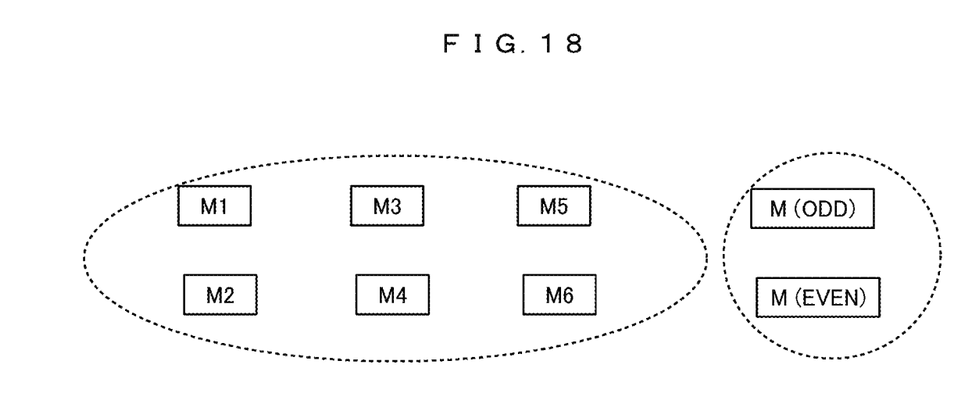
FIG. 18 is an explanatory diagram of an example of priority order determination in the electric vehicle according to a tenth embodiment.

FIG. 18 shows the concept of this embodiment. In this embodiment, instead of dividing the electric vehicles into an uphill travel group and a downhill travel group, each group is formed by adjacent electric vehicles.

This embodiment is advantageous in that it can cope with a poor wireless communication environment although the number of electric vehicles belonging to a group on the uphill line or downhill line is decreased.

Embodiment 11

When a plurality of electric vehicles travel on each of the uphill line and downhill line as shown in FIG. 1, if the overhead wire voltage supplied to an electric vehicle or the circuit voltage in an electric vehicle deviates from a predetermined range, for example the following phenomena may occur as a result of electrically disconnecting the electric vehicle from the overhead wire:

(A) One case is that the circuit voltage of the electric vehicle connected to the power line is lower than the lower limit of the predetermined range.

When the electric vehicle under power running on the uphill line is disconnected from the overhead wire, the energy of the whole power line system increases and thus the circuit voltage in the other electric vehicles connected to the power line increases and returns to the predetermined range.

On the other hand, when the electric vehicle under speed holding or regenerative braking on the downhill line is disconnected from the overhead wire, the power energy of the whole overhead wire system deceases and the circuit voltage in the other electric vehicles further decreases and its deviation from the predetermined range becomes larger.

In other words, if the voltage is lower than the lower limit, the electric vehicle on the uphill line must be disconnected.

(B) Another case is that the circuit voltage of the electric vehicle connected to the power line is higher than the upper limit of the predetermined range.

When the electric vehicle under speed holding or regenerative braking on the downhill line is disconnected from the overhead wire, the energy of the whole power line system decreases and thus the circuit voltage in the other electric vehicles connected to the overhead wire decreases and returns to the predetermined range.

On the other hand, when the electric vehicle under power running on the uphill line is disconnected from the power line, the energy of the whole overhead wire system increases and the circuit voltage in the other electric vehicles connected to the overhead wire further increases and the deviation from the predetermined range becomes larger.

In other words, if the voltage is higher than the upper limit, the electric vehicle on the downhill line must be disconnected.

Therefore, this embodiment is characterized in that when the deviation of the circuit voltage in the electric vehicle connected to the power line from the predetermined range continues for a longer time than a previously set check time, the electric vehicle is disconnected from the power line and furthermore the easiness of disconnection during power running is different from that during speed holding/braking.

One approach to differentiate the easiness of disconnection between the power-running period and the speed holding/braking period is to differentiate the time to check for deviation of the voltage from the predetermined range between the power-running period and the speed holding/braking period.

Regarding the time to check whether the circuit voltage is higher than the upper limit of the predetermined range, the check time during power running should be longer than the check time during speed holding/braking. Conversely, regarding the time to check whether the circuit voltage is lower than the lower limit of the predetermined range, the check time during speed holding/braking should be longer than the check time during power running.

In short, when the circuit voltage is higher than the predetermined range, the check time for disconnection of the electric vehicle under power running should be longer than the check time for disconnection of the electric vehicle under speed holding/braking. When the circuit voltage is lower than the predetermined range, the check time for disconnection of the electric vehicle under speed holding/braking should be longer than the check time for disconnection of the electric vehicle under power running.

By doing so, the following effects can be achieved and the problem can be solved.

When the circuit voltage in an electric vehicle connected to the power line is lower than the lower limit of the predetermined range, the electric vehicle under power running is disconnected from the power line prior to the electric vehicle under speed holding/braking, so depending on the disconnection of the electric vehicle from the power line, the energy of the whole power line system increases and the circuit voltage in the other electric vehicles connected to the power line increases and only works to return to the predetermined range.

Consequently, the deviation of the circuit voltage is not accelerated, so a chain of disconnections of electric vehicles does not occur.

On the other hand, when the circuit voltage in an electric vehicle connected to the power line is higher than the upper limit of the predetermined range, the electric vehicle under speed holding/braking is disconnected from the power line prior to the electric vehicle under power running, so depending on the disconnection of the electric vehicle from the power line, the energy of the whole power line system decreases and the circuit voltage in the other electric vehicles connected to the power line decreases and only works to return to the predetermined range.

Consequently, the deviation of the circuit voltage is not accelerated, so a chain of disconnections of electric vehicles does not occur.

In other words, this may be summarized as follows.

The controller CT, etc. of the electric vehicle judges the travel condition of the electric vehicle, namely whether it is under power running or under speed holding/braking and depending on the result of the judgement, the length of check time for disconnection is determined as follows according to whether the circuit voltage is higher or lower than the predetermined range:

(A) speed-holding/braking state: higher<lower
(B) power running state: higher>lower In this embodiment, the voltage range to judge whether to disconnect the electric vehicle from the power line is differentiated according to the travel condition of the electric vehicle itself, so each electric vehicle can be disconnected independently for stabilization of the system and thus the whole electric vehicle system can be operated stably.

Embodiment 12

The difference of this embodiment from the eleventh embodiment is that the method to differentiate the easiness of disconnection is different from the method in the eleventh embodiment.

This embodiment uses, as another method to differentiate the easiness of disconnection between the power running period and the speed holding/braking period, the method to differentiate the level of circuit voltage deviation from the predetermined range between the power running period and the speed holding/braking period. As one example, the predetermined range of circuit voltage during the power running period is higher than that during the speed holding/braking period. By doing so, even when the circuit voltage in the electric vehicle under speed holding/braking is higher than the upper limit of the predetermined range, the circuit voltage in the electric vehicle under power running does not deviate from the predetermined range and can continue traveling stably. Then, disconnection of the electric vehicle under speed holding/braking causes the voltage of the electric power system to decrease and return to the predetermined range so that the whole electric system is stabilized.

On the other hand, even when the circuit voltage in the electric vehicle under power running is lower than the lower limit of the predetermined range, the circuit voltage in the electric vehicle under speed holding/braking does not deviate from the predetermined range and the supply of the regenerated voltage can be continued. In this case, disconnection of the electric vehicle under power running as a consumer of the power causes the voltage of the power system to increase and return to the predetermined range so that the whole power system is stabilized.

In other words, this may be summarized as follows.

The controller CT, etc. judges the travel condition of the electric vehicle, namely whether it is under power running or under speed holding/braking and according to the result of judgement, the predetermined range of the circuit voltage should be as follows:

Power running state>Speed holding/braking state

In this embodiment, the voltage range to judge whether to disconnect the electric vehicle from the power line is differentiated according to the travel condition of the electric vehicle itself, so each electric vehicle can be disconnected independently for stabilization of the system and thus the whole electric vehicle system can be operated stably.

When each of the above embodiments is applied alone or, if possible, in combination with any other of them, it is included in the range of disclosure of the present specification.

REFERENCE SIGNS LIST 1 overhead wire
1A uphill side high-voltage side power line
2A downhill side high-voltage side power line
1B uphill side low-voltage side power line
2B downhill side low-voltage side power line
PT, PT1, PT2 pantograph (collector)
M electric vehicle
M1 electric vehicle on the uphill line
M2 electric vehicle on the downhill line
RD1, RD2 road surface
50 slope
PS power source
CT controller
BAT battery (power supply device)
PC power controller
LD load
MT motor
SW switching device
CC central center

The invention claimed is:

1. An electric vehicle that is driven by power obtained from a power line via a collector, an energy source mounted on the electric vehicle, or using both thereof, and causes power generated during braking to be regenerated to the power line via the collector or to be consumed in a load mounted on the electric vehicle, wherein
   the electric vehicle has a function of electrically separating the collector from the power line when a voltage of the power line or a circuit voltage within the electric vehicle deviates from a predetermined range; and
   when the electrical vehicle travels, the electric vehicle is configured to specify which power line to electrically separate from, wherein
      judgement as to whether the voltage of the power line or the circuit voltage in the electric vehicle deviates from the predetermined range is made by a sensor mounted on the electric vehicle and setting of a response speed of the sensor can be made for the electric vehicle.

2. The electric vehicle according to claim 1, wherein the function of electrically separating is performed by separating a mechanical collector and the power line in terms of distance.

3. The electric vehicle according to claim 1, wherein the function of electrically separating is performed by a switching device mounted on the electric vehicle.

4. The electric vehicle according to claim 1, wherein the setting can be made for the electric vehicle from an external center.

5. The electric vehicle according to claim 1, wherein judgement as to whether the voltage of the power line or the circuit voltage in the electric vehicle deviates from the predetermined range is made by a sensor mounted on the electric vehicle and according to information from the sensor, an external center instructs the electric vehicle to perform the function of electrically separating from the power line.

6. The electric vehicle according to claim 1, wherein judgement as to whether the voltage of the power line or the circuit voltage in the electric vehicle deviates from the predetermined range is made by a sensor mounted on the electric vehicle and according to information from the sensor, an electric vehicle to perform the function of electrically separating from the power line is determined by mutual wireless communication within a group of electric vehicles.

7. An electric vehicle system that is operated by an electric vehicle according to claim 1.

8. An electric vehicle that is driven by power obtained from a power line via a collector, an energy source mounted on the electric vehicle, or using both thereof, and causes power generated during braking to be regenerated to the power line via the collector or to be consumed in a load mounted on the electric vehicle, wherein
   the electric vehicle has a function of electrically separating the collector from the power line when a voltage of the power line or a circuit voltage within the electric vehicle deviates from a predetermined range,
   comprising a controller to determine a travel condition thereof, wherein the travel condition is associated with under power running or under speed holding/braking, wherein
   a length of check time for disconnection before the function of electrically separating the collector from the power line is performed is determined according to whether the circuit voltage is higher or lower than a predetermined range, as follows:

the speed holding/braking state is lower than the predetermined range, and the power running state is higher than the predetermined range.

9. An electric vehicle system that is operated by an electric vehicle according to claim 8.

10. An electric vehicle that is driven by power obtained from a power line via a collector, an energy source mounted on the electric vehicle, or using both thereof, and causes power generated during braking to be regenerated to the power line via the collector or to be consumed in a load mounted on the electric vehicle, wherein the electric vehicle has a function of electrically separating the collector from the power line when a voltage of the power line or a circuit voltage within the electric vehicle deviates from a predetermined range, comprising a controller to determine a travel condition thereof, namely whether it is under power running or under speed holding/braking, wherein one of: i) a specified voltage range of the power line voltage, or ii) the circuit voltage in the electric vehicle, is higher than the normal power running state power line voltage, or less than the normal speed holding/braking state power line voltage.

11. An electric vehicle system that is operated by an electric vehilce according to claim 10.

* * * * *